United States Patent [19]

Graham et al.

[11] Patent Number: 5,738,913

[45] Date of Patent: Apr. 14, 1998

[54] METHOD OF PROVIDING CERAMIC ARTICLE WITH WEAR RESISTANT COATING

[75] Inventors: Edgar Earl Graham, Lyndhurst; Wilfredo Morales, Lorain; Nirav Patel, Cleveland, all of Ohio

[73] Assignee: Cleveland State University, Cleveland, Ohio

[21] Appl. No.: 747,970

[22] Filed: Nov. 12, 1996

[51] Int. Cl.⁶ .............................. B05D 1/36; B05D 3/02; B05D 7/24; B05D 1/38

[52] U.S. Cl. .................. 427/419.8; 427/419.1; 427/419.5; 427/407.1; 427/380; 427/255.2; 427/255.6

[58] Field of Search .................. 427/407.1, 404, 427/419.5, 419.1, 419.2, 419.8, 255.2, 255.3, 255.6, 255.5, 380

[56] References Cited

U.S. PATENT DOCUMENTS

| | | | |
|---|---|---|---|
| 3,983,270 | 9/1976 | Licari et al. | 427/372.2 |
| 4,239,816 | 12/1980 | Breininger et al. | 427/168 |
| 4,876,117 | 10/1989 | Bornstein | 427/241 |
| 5,139,876 | 8/1992 | Graham et al. | 428/411.1 |
| 5,163,757 | 11/1992 | Graham | 384/463 |
| 5,167,674 | 12/1992 | Ika | 51/298 |
| 5,351,786 | 10/1994 | Graham et al. | 184/6.22 |
| 5,407,590 | 4/1995 | Salvia | 252/12 |
| 5,498,354 | 3/1996 | Graham et al. | 252/48.2 |
| 5,554,309 | 9/1996 | Bruce et al. | 508/312 |

*Primary Examiner*—Diana Dudash
*Attorney, Agent, or Firm*—Jane M. Marciniszyn, Esq.

[57] ABSTRACT

An improved method is disclosed to provide a ceramic article with a protective coating which resists mechanical wear at elevated temperatures up to 500° C. and higher. The coating is formed by first treating the ceramic article's surface with transition metal ions deposited at ambient temperatures, thereafter depositing a mixture containing said transition metal ions and a polymer-forming organic reactant on the treated ceramic article surface at ambient temperatures, and heating the ceramic article to at least 300° C. for polymerization of the organic reactant. Ceramic articles provided with such protective coating include silicon carbide, silicon nitride and vitreous silica.

18 Claims, 1 Drawing Sheet

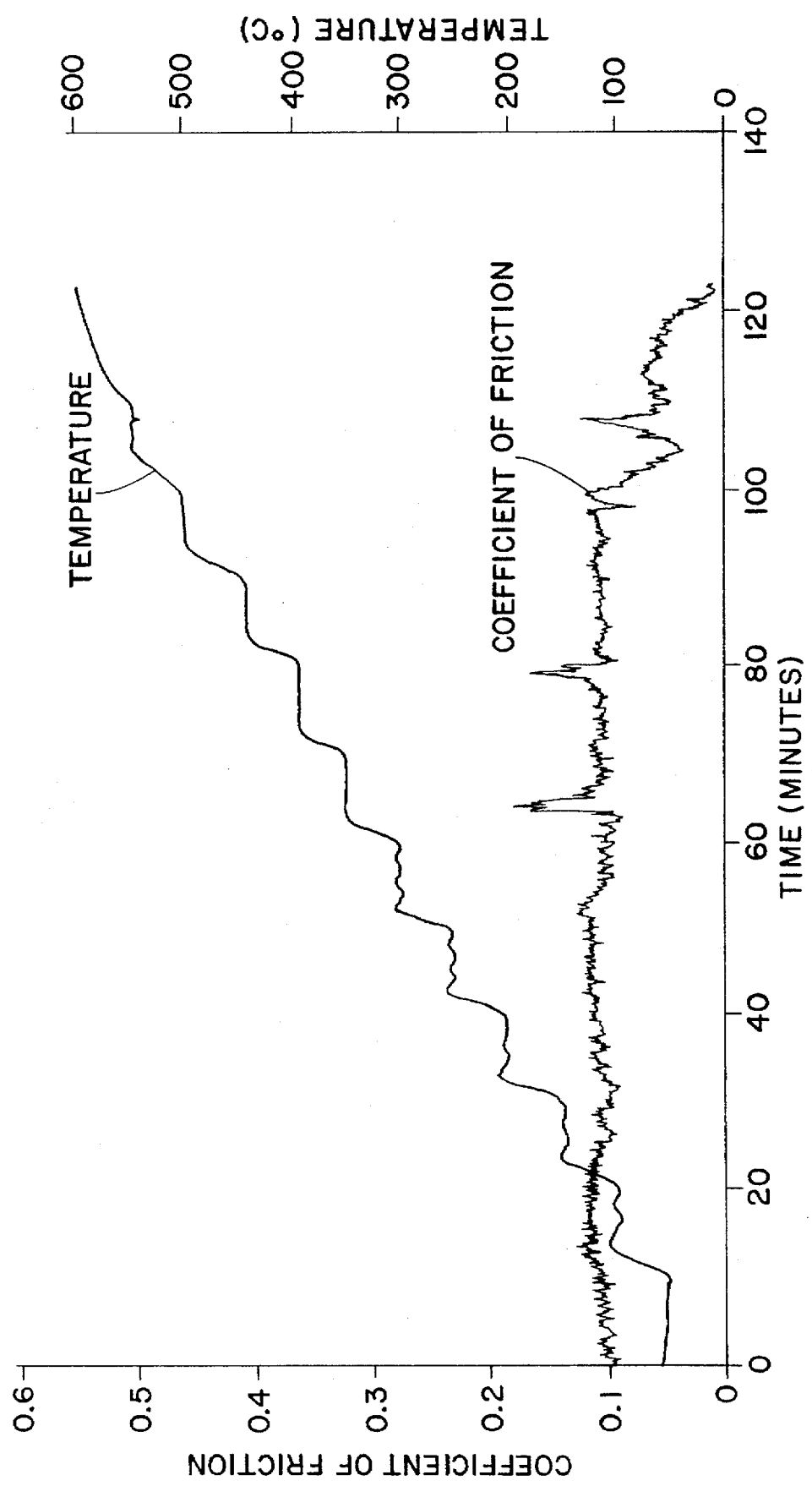

METHOD OF PROVIDING CERAMIC ARTICLE WITH WEAR RESISTANT COATING

BACKGROUND OF THE INVENTION

This invention relates generally to a method providing a ceramic article with a protective coating to resist mechanical wear at elevated temperatures of 500° C. and higher, and more particularly to affording such protection to a variety of ceramic articles with a protective coating formed in an improved manner.

Lubrication is a well recognized means to reduce friction and wear between ceramic article surfaces in dynamic physical contact, such as bearings. In such latter regard, a pair of load bearing surfaces having relative movement therebetween will be in rolling or sliding contact, as well as combinations thereof, which can include a wide variety of known structural articles such as journal bearings, piston rings, gears, cams and the like. Two major areas for which improved lubricants are needed for continued progress at elevated temperatures are metal forming and transportation. A known technique for lubrication of bearings at operating temperatures of 300° C. and above is the use of solid lubricants in the form of plasma sprayed coatings of the metals and ceramics being employed.

Various organic lubricants which are applied as liquids at elevated temperatures of bearing operation are already known. For example, a published article entitled "Properties of a New Class of Polyaromatics for Use as High Temperature Lubricants and Functional Fluids" ASLE transaction, Volume 9, Issue 1, pages 13–23 reports the development of organic liquids for lubrication at elevated temperatures to include polyphenyls, polyphenylethers and polyphenylthioethers. Subsequent investigations employing the later lubricant are further reported in NASA publications entitled "Formulation and Evaluation of C-Ether Fluids as Lubricants Useful to 260° C.", dated Dec. 16, 1980 and NASA technical memorandum 83474 entitled "High Pressure Liquid Chromatography: A Brief Introduction, and Its Application Analyzing the Degradation of C-ether" (Thioether) Liquid Lubricant" dated September 1983. In both NASA publications, degradation of the starting thioether lubricant was found to occur at elevated temperatures of bearing operation, however, limiting the use temperature of this lubricant to no greater than 260° C. Still other already prepared solid and liquid organic lubricants have also been employed for satisfactory lubrication at elevated operating temperatures. For example, U.S. Pat. No. 5,206,404 discloses organic phosphate esters deemed suitable for jet engine lubrication and the like. Similarly, phosphazene compounds deemed suitable for lubrication at elevated temperatures are commercially available as disclosed in U.S. Pat. No. 5,351,786.

Ceramic articles such as bearing devices can also be lubricated during operation at extremely elevated temperatures with various organic polymers formed in situ. These protective coatings are formed with a vaporized polymer-forming organic reactant which deposits an adherent polymer lubricating film on the operating bearing surface. For example, a tenacious polymer lubricating film is disclosed in U.S. Pat. No. 5,139,876 upon treating ceramic bearing surfaces during operation at elevated temperatures of at least 300° C. with vaporized organic reactants such as petroleum hydrocarbon compounds, mineral oils, various synthetic lubricants and to further include tricresyl phosphate (TCP) and triphenyl phosphate. In a still more recently issued U.S. Pat. No. 5,351,786 there is further disclosed lubrication means for such operation of these bearing devices with polymer lubricants formed in situ upon vapor-phase deposition of the various phosphazene compounds. Both prior art patents further require pretreatment of the uncoated ceramic article surfaces at elevated temperatures with activating metal ions comprising a transition metal element selected from the Periodic Table of Elements to include iron and tin.

It remains desirable to provide such wear resistant polymer lubrication in an improved manner. The prior art requirement for introducing activating metal ions at elevated temperatures understandably further requires that the ceramic article being treated or the source of these metal ions be heated. Likewise, elevated temperatures have further been employed heretofor to introduce the organic reactant in a vaporized form enabling a vapor-phase polymerization of said reactant to occur. The costs and shortcomings attributable to both of said requirements understandably serves to limit wider application of the existing lubrication procedure.

Accordingly, it is one object of the present invention to provide an improved method whereby various ceramic articles can be provided with a wear resistant polymer coating.

It is another object of the present invention to provide an improved method to continuously lubricate ceramic articles having bearing surfaces while being operated at extremely elevated temperatures.

A still further object of the present invention is to provide an improved method for lubrication of ceramic bearing surfaces being operated at extremely elevated temperatures with relatively low lubricant levels.

These and further objects of the present invention will become more apparent upon considering the following more detailed description of the present invention.

SUMMARY OF THE INVENTION

It has been discovered, surprisingly, that far lower temperature conditions can be utilized to produce the desired wear resistant polymer lubrication film according to the present invention. More particularly, the activating metal ions can first be deposited on the ceramic article surface at ordinary ambient temperatures to be followed by exposure with heating of the treated ceramic surface to a suitable polymer forming medium and which can be initiated at ordinary ambient temperatures. Polymer formation occurs upon heating of the treated ceramic article surface to at least 300° C. and higher whereupon a polymer-forming organic reactant previously deposited on said surface in admixture with additional activating metal ions undergoes polymerization to form the desired adherent polymer lubricating film. In one representative embodiment, activation of the bare ceramic article surface is carried out under ordinary atmospheric and ambient temperature conditions with an organic liquid solution containing a dissolved compound of a transition metal element selected from the Periodic Table of Elements to include iron and tin. Suitable activation of the ceramic surface in such manner can thereby be carried out with a one percent by weight ferric acetylacetonate solution in dichloromethane, for example, being initially deposited on said bare ceramic surface at room temperature and thereafter heating said deposit to produce a metallic-like film on which the protective polymer lubrication coating can be subsequently developed. In doing so according to said embodiment, a second organic liquid solution containing one weight percent ferric acelylacetonate, 49.5 weight percent tributyl phosphate and 49.5 weight percent polyphenyl thioether is deposited on the now activated ceramic surface again at room temperature followed by heating the coated ceramic article to elevated temperatures of at least 300° C. Such heating of the treated ceramic article causes polymerization of the thioether component in the deposited coating to produce a tenacious lubricating film on the activated ceramic surface. While the influence of heating the present polymer-forming coating has not been fully investigated at this time, it is believed attributable at least in part to some vapor-phase polymer formation taking place similar to that already disclosed in the previously issued U.S. Pat. Nos. 5,139,876 and 5,351,786 patents.

Suitable organic reactants for polymerization in accordance with the present invention can be further characterized as exhibiting relative chemical inertness and thermal stability in the elevated temperature range herein being employed. Accordingly, petroleum hydrocarbon compounds such as dodecane and mineral oils can be used as well as aromatic type compounds. Useful synthetic lubricants including polybutenes, diesters, polyglycols, chlorinated hydrocarbons, phosphate esters, silicate esters and the like. Suitable phosphate ester starting materials can be selected from the class of aryl phosphate esters to include isopropyl phenyl phosphates (IPPP) and tri-butyl phenyl phosphates (TBPP) as well as tricresyl phosphates, triphenyl phosphates, mixed cresyl-xylenyl phosphates and cresyl-diphenyl phosphates. A representative commercial triaryl phosphate supplied by FMC Corporation is available under the trade name "Durad 620B". Similarly, suitable thioether starting materials can be selected from the class of aromatic thioether compounds generally made available commercially as liquid mixtures of several individual compounds to include 1,1-thiobis-(3-phenoxylbenzene), 1-phenoxy-3[3-(phenylthio)phenyl] thiobenzene, 1-1-thiobis-[3-phenythio] benzene, and 1,3-bis-(phenylthio) benzene. Polymerizable phosphazene starting materials also suitable for use include linear phosphazene, cyclophosphazene and cyclotetraphosphazene, including mixtures thereof.

Broad product application of the above summarized method is contemplated to include a wide variety of ceramic articles. Silicon carbide and silicon nitride ceramics are now being studied extensively for high temperature engineering applications as above indicated to include advanced heat engines and gas turbines. Both ceramics are crystalline materials with silicon carbide being a very hard material which is both corrosion and thermal resistant, is lighter than steel and exhibits a high thermal conductivity and low thermal expansion whereas silicon nitride is characterized by low thermal expansion, excellent corrosion resistance and high temperature stability. On the other hand, both of said ceramic materials undergo significant mechanical abrasion when subjected to the dynamic wear conditions being experienced with such product applications. Vitreous silica or fused quartz represents still a different type ceramic material experiencing aggravated physical wear of subject to dynamic operating conditions particularly at elevated temperatures.

BRIEF DESCRIPTION OF THE DRAWING

The accompanying drawing is a graph providing friction force measurements for a particular lubrication means provided by the method of the present invention.

DETAILED DESCRIPTION OF THE PREFERRED EMBODIMENTS

To still more specifically illustrate the present method in connection with the aforementioned embodiment, a representative protective coating was produced on the surface of a silicon nitride test sample according to the present invention. More particularly, the bare surface of said test sample on which the wear resistant polymer coating was to be developed was first pretreated with a source of activating transition metal ions prior to its utilization in a test apparatus enabling formation of the polymer while friction measurements were being conducted at elevated operating temperatures. Accordingly, a major surface of the silicon nitride plate was first coated at room temperature in the ambient atmosphere with a thin liquid film provided with 1 weight percent ferric acetylacetonate dissolved in dichloromethane and the treated sample thereafter heated to approximately 300° C. in the ambient atmosphere to produce a continuous metallic-like film of the activating metal ions on the ceramic substrate. The pretreated ceramic plate was next utilized as the movable member in a conventional tribometer type test apparatus further employing a stationary silicon nitride pin loaded with a 4 kilogram mass to generate operating contact pressures of approximately 1.2 MPa against the reciprocating test sample. During operation of said test apparatus, the surface of the pretreated silicon nitride plate was further continuously coated with a liquid solution consisting of approximately 1 weight percent ferric acetylacetonate, 49.5 weight percent tributyl phosphate and 49.5 weight percent polyphenyl thioether being deposited at a rate of approximately 0.4 cc/min. Such polymer-forming deposit was initiated at room temperature operation of the test apparatus with operating temperatures being thereafter continuously elevated during the test procedure.

Friction measurements further conducted during the foregoing test procedure are reported on the accompanying drawing. As therein depicted, the time period of the test duration is depicted on the abscicca of said graph with friction coefficients being reported on the left graph ordinate and operating temperatures being reported on the right graph ordinate. The substantially continuous friction coefficients being measured while operating temperatures were steadily ramped upward to an operating temperature exceeding 500° C. can be noted on said graph. From these measurements it can be noted that said friction coefficient remains relatively constant until the operating temperature exceeds 400° C. but decreases substantially thereafter with higher temperature exposure. Such improved resistance to mechanical wear despite continuing exposure to still higher temperatures is significant evidence that polymerization of the thioether component in the deposited coating had taken place. An additional benefit observed from said test measurements was absence of any detectable wear on the test plate following the illustrated test procedure. Similar results were also achieved when the aforementioned Durad 620B phosphate ester starting material replaced polyphenyl thioether in the herein illustrated polymer-forming composition. As distinct from such increased resistance to mechanical wear at extremely elevated operating temperatures, immediate bearing failure is generally experienced at these operating temperatures when conventional organic lubricants are being employed.

It will be apparent from the foregoing description that a broadly useful and novel method has been provided to continuously lubricate various ceramic bearing surfaces when operated under various atmospheric conditions at extremely elevated temperatures of 500° C. and higher. It is contemplated that such improved lubrication can likewise be provided with a broad range of load bearing ceramic constructions in rolling/sliding contact other than above specifically illustrated, however, to include both ball and roller bearing devices as well as apparatus employing gears, cams, piston rings and the like. Likewise, it is contemplated that enhancement of resistance to mechanical wear with the present method of lubrication can possibly be further improved utilizing ancillary means described in the previously cited patents. Substituting still other ceramic materials than herein illustrated for construction of the various ceramic articles could also still desirably lower lubricant levels being employed in the present method at these elevated temperatures. Consequently, it is intended to limit the present invention only by the scope of the appended claims.

What we claim as new and desire to secure by Letters Patent of the United States is:

1. A method to lubricate a ceramic article providing improved resistance of the lubricated ceramic article to mechanical wear at elevated temperatures up to 500° C. and above which comprises:

(a) treating an untreated and an unheated surface of the ceramic article at ambient temperatures with a compound of a transition metal element;

(b) further treating the already treated ceramic article surface at ambient temperatures with a mixture containing the transition metal compound, a polymer-forming organic reactant selected from petroleum hydrocarbon compounds and synthetic-lubricants consisting of polybutenes, diesters, polyglycols, chlorinated hydrocarbons, phosphate esters and silicate esters, and an aromatic thioether; and (c) elevating the temperature of the treated ceramic article to at least 300° C. whereby the organic reactants become polymerized to form an adherent polymer lubricating film on the treated ceramic surface.

2. The method of claim 1 wherein the ceramic article is a vitreous metal oxide.

3. The method of claim 1 wherein the ceramic article is silicon nitride.

4. The method of claim 1 wherein the ceramic article is silicon carbide.

5. The method of claim 1 wherein treatment of the untreated ceramic article surface is carried out with an organic liquid solution of the transition metal compound.

6. The method of claim 1 wherein treatment of the already treated ceramic article surface is carried out with an organic liquid solution containing both transition metal compound and polymer forming organic reactant.

7. The method of claim 1, wherein the ceramic article is a pair of ceramic beating surfaces and wherein the surfaces of the pair of ceramic bearings which have the polymerized lubricating film thereon are in dynamic contact at operating temperatures of at least 300° C.

8. A method to lubricate a ceramic article providing improved resistance of the lubricating ceramic article to mechanical wear at elevated temperatures up to 500° C. and above which comprises:

(a) treating an untreated and an unheated surface of the ceramic article at ambient temperatures with an organic liquid solution containing a dissolved iron compound;

(b) further treating the already treated ceramic article surface at ambient temperatures with an organic liquid solution containing the dissolved iron compound, a vaporizable polyphenyl thioether, and a tributyl phosphate; and (c) elevating the temperature of the treated ceramic article to at least 300° C. whereby the polyphenyl thioether and the tributyl phosphate are caused to vaporize and polymerize in the vapor phase to form a vapor-deposited adherent solid polymer lubricating film on the treated ceramic article surface.

9. The method of claim 8, wherein the ceramic article is a pair of ceramic bearing surfaces and wherein the surfaces of the pair of ceramic bearings which have the polymerized lubricating film thereon are in dynamic physical contact at an operating temperature of at least 300° C.

10. The method of claim 8, wherein the ceramic article is selected from the group consisting of a vitreous metal oxide, a silicon nitride and a silicon carbide.

11. The method of claim 8, wherein step (a) the dissolved iron compound is 1 weight percent ferric acetylacetonate dissolved in dichloromethane.

12. The method of claim 8, wherein step (b) the ceramic article was treated with a liquid solution containing 1 weight percent ferric acetylacetonate, 49.5 weight percent polyphenyl thioether and 49.5 weight percent tributyl phosphate.

13. The method of claim 8, wherein the ceramic article is a pair of ceramic bearing surfaces and wherein the surfaces of the pair of ceramic bearings which have the polymerized lubricating film thereon are in dynamic contact at an operating temperature of at least 300° C.

14. A method to lubricate a ceramic article providing improved resistance of the lubricated ceramic article to mechanical wear at elevated temperatures up to 500° C. and above which comprises:

(a) treating an untreated and an unheated surface of the ceramic article at ambient temperatures with an organic solution containing a dissolved iron compound;

(b) further treating the already treated ceramic article surface at ambient temperatures with an organic liquid solution containing the dissolved iron compound, a tributyl phosphate and a triaryl phosphate; and (c) elevating the temperature of the treated ceramic article to at least 300° C. whereby the organic reactants become polymerized to form an adherent polymer lubricating film on the treated ceramic surface.

15. The method of claim 14, wherein the ceramic article selected from a group consisting of a vitreous metal oxide, a silicon nitride and a silicon carbide.

16. The method of claim 14, wherein in step (a) organic liquid solution is dichloromethane and contains 1 weight percent ferric acetylacetonate.

17. The method of claim 16, wherein after step (a) the treated ceramic article is heated to approximately 300° C. in ambient atmosphere to produce a continuous film.

18. The method of claim 14, wherein the ceramic article is a pair of ceramic bearing surfaces and wherein the surfaces of the pair of ceramic bearings which have the polymerized lubricating film thereon are in dynamic physical contact at an operating temperature of at least 300° C.

* * * * *